(12) United States Patent
Fontenot et al.

(10) Patent No.: US 11,494,850 B1
(45) Date of Patent: Nov. 8, 2022

(54) APPLIED ARTIFICIAL INTELLIGENCE TECHNOLOGY FOR DETECTING ANOMALIES IN PAYROLL DATA

(71) Applicant: Alight Solutions LLC, Lincolnshire, IL (US)

(72) Inventors: Jeffrey Fontenot, Huntersville, NC (US); Sarah Baxter, Greenville, NC (US); Edmond Chan, Conroe, TX (US); Jill Westhoff, Whitefish Bay, WI (US); Wilson Silva, The Woodlands, TX (US); Barrington Young, Austin, TX (US)

(73) Assignee: ALIGHT SOLUTIONS LLC, Lincolnshire, IL (US)

( * ) Notice: Subject to any disclaimer, the term of this patent is extended or adjusted under 35 U.S.C. 154(b) by 13 days.

(21) Appl. No.: 16/817,861

(22) Filed: Mar. 13, 2020

Related U.S. Application Data

(60) Provisional application No. 62/817,950, filed on Mar. 13, 2019.

(51) Int. Cl.
*G06Q 40/00* (2012.01)

(52) U.S. Cl.
CPC .................................. *G06Q 40/125* (2013.12)

(58) Field of Classification Search
None
See application file for complete search history.

(56) References Cited

U.S. PATENT DOCUMENTS

| | | | |
|---|---|---|---|
| 7,024,389 B1* | 4/2006 | Watkins | G06Q 20/02 705/26.1 |
| 9,355,155 B1* | 5/2016 | Cassel | G06F 16/9535 |
| 9,978,098 B1* | 5/2018 | Grossblatt | G06Q 40/02 |
| 10,587,580 B2* | 3/2020 | Subbarayan | G06N 20/00 |
| 11,330,005 B2* | 5/2022 | Beauchesne | H04L 63/1408 |
| 11,363,043 B2* | 6/2022 | Murphy | H04L 63/145 |
| 2003/0074311 A1* | 4/2003 | Saylors | G06Q 40/02 705/39 |
| 2003/0097342 A1* | 5/2003 | Whittingtom | G06Q 10/10 705/75 |
| 2004/0049436 A1* | 3/2004 | Brand | G06Q 40/12 705/30 |
| 2005/0192823 A1* | 9/2005 | Kuhn | G06Q 10/0639 705/7.42 |

(Continued)

*Primary Examiner* — Fateh M Obaid
(74) *Attorney, Agent, or Firm* — Thompson Coburn LLP; Benjamin L. Volk, Jr.

(57) ABSTRACT

Artificial intelligence techniques for scalably detecting anomalies within payroll data for a plurality of payees are disclosed. The payroll data may comprise a plurality of payroll records that are associated with a plurality of payees, and the inventive computer system can detect anomalies via steps such as (1) processing a history of the payroll records for a payee to generate a payee-specific pay distribution model, (2) comparing the payroll record for a pay period for the payee with the payee-specific pay distribution model, (3) determining whether a payroll anomaly for the payee exists within the payroll record for the pay period for the payee based on the comparing step, (4) in response to a determination that a payroll anomaly for the payee exists, flagging the payroll anomaly for further review or analysis, and (5) performing the processing, comparing, determining, and flagging steps for a plurality of payees.

34 Claims, 15 Drawing Sheets

(56) References Cited

U.S. PATENT DOCUMENTS

| | | | |
|---|---|---|---|
| 2008/0120129 A1* | 5/2008 | Seubert | G06Q 10/10 |
| | | | 705/35 |
| 2010/0057597 A1* | 3/2010 | Vilrokx | G06Q 10/06 |
| | | | 705/32 |
| 2010/0211485 A1* | 8/2010 | Augustine | G06Q 10/00 |
| | | | 705/32 |
| 2013/0054259 A1* | 2/2013 | Wojtusiak | G06Q 10/10 |
| | | | 705/2 |
| 2013/0246257 A1* | 9/2013 | Burke | G06Q 20/102 |
| | | | 705/40 |
| 2014/0324645 A1* | 10/2014 | Stiffler | G06Q 40/12 |
| | | | 705/30 |
| 2017/0004487 A1* | 1/2017 | Hagen | G06F 16/215 |
| 2018/0115578 A1* | 4/2018 | Subbarayan | H04L 63/04 |
| 2020/0294642 A1* | 9/2020 | Bostic | G16H 20/10 |

* cited by examiner

| Date | Code 4 | Code 18 | Code 22 | Code 24 | 25 | Code 27 | Code 28 | Code 29 | Code 31 | Code 32 | Code 38 | 42 | Code 46 | 51 | 54 | Code 127 |
|---|---|---|---|---|---|---|---|---|---|---|---|---|---|---|---|---|
| 8/13/2019 | 530.28 | 3679.38 | 1154.28 | 281.48 | 0 | 53.36 | 53.36 | 2525.1 | 228.12 | 228.12 | 3679.38 | 0 | 195.09 | 0 | 0 | none |
| 7/27/2019 | 530.28 | 3679.38 | 1154.27 | 281.47 | 0 | 53.35 | 53.35 | 2525.11 | 228.12 | 228.12 | 3679.38 | 0 | 195.09 | 0 | 0 | none |
| 7/13/2019 | 530.28 | 3679.38 | 1154.27 | 281.47 | 0 | 53.35 | 53.35 | 2525.11 | 228.12 | 228.12 | 3679.38 | 0 | 195.09 | 0 | 0 | none |
| 6/28/2019 | 530.28 | 3679.38 | 1154.63 | 281.47 | 0 | 53.35 | 53.35 | 2524.75 | 228.12 | 228.12 | 3679.38 | 0 | 195.09 | 0 | 0 | none |
| 6/13/2019 | 530.28 | 3679.38 | 1313.5 | 281.47 | 0 | 53.35 | 53.35 | 2365.88 | 228.12 | 228.12 | 3679.38 | 0 | 353.96 | 0 | 0 | none |

— 600

Pay Code Table

| Component ID | Component Name |
|---|---|
| 4 | Federal Withholding [USA]-W_FW-Federal:Federal |
| 18 | Gross_Pay |
| 22 | Total_EE_Taxes |
| 24 | Total_ER_Taxes |
| 25 | FUI(ER) [USA]-W_FUI-Federal:Federal |
| 27 | Medicare(ER) [USA]-w_MEDER-Federal:Federal |
| 28 | Medicare [USA]-w_MEDER-Federal:Federal |
| 29 | Net_Pay |
| 31 | OASDI (ER) [USA]-W_OASER-Federal:Federal |
| 32 | OASDI [USA]-W_OAS-Federal:Federal |
| 38 | OP_Regular Pay-REG-SAL |
| 42 | State Withholding (Resident) [USA]-W_SWR-State:Pennsylvania |
| 46 | State Withholding (Work) [USA]-W_SWW-State:New York |
| 51 | SUI (ER) [UDA]-W_SUIER-State:New York |
| 54 | Total_Deductions |
| 127 | OP_Spot Bonus (USA)-SPOT |

| Component ID (Index) (704) | Mu (706) | Sigma (708) | Tolerance (710) |
|---|---|---|---|
| 4 | 530.28 | 0.0000507 | 1.1 |
| 18 | 3679.38 | 0.0002030 | 1.1 |
| 22 | 1154.63 | 158.8704078 | 1.1 |
| 24 | 281.47 | 0.0000021 | 1.1 |
| 25 | 0 | 0.0000000 | 1.1 |
| 27 | 53.35 | 0.0000026 | 1.1 |
| 28 | 53.35 | 0.0000026 | 1.1 |
| 29 | 2524.75 | 158.870523 | 1.1 |
| 31 | 228.12 | 0.0000085 | 1.1 |
| 32 | 228.12 | 0.0000085 | 1.1 |
| 38 | 3679.38 | 0.0002030 | 1.1 |
| 42 | 0 | 0.0000000 | 1.1 |
| 46 | 195.09 | 158.8699915 | 1.1 |
| 51 | 0 | 0.0000000 | 1.1 |
| 54 | 0 | 0.0000000 | 1.1 |
| 127 | 0 | 0.0000000 | 1.0 |

702

| Component ID | Current Period Value |
|---|---|
| 4 | 7146.77 |
| 18 | 23679.38 |
| 22 | 12018.68 |
| 24 | 1811.47 |
| 25 | 0 |
| 27 | 343.35 |
| 28 | 343.35 |
| 29 | 11660.7 |
| 31 | 1468.12 |
| 32 | 1468.12 |
| 38 | 3679.38 |
| 42 | 0 |
| 46 | 2119.09 |
| 51 | 0 |
| 54 | 0 |
| 127 | 20000 |

700

750: Anomaly detection via comparison of employee's current pay data (on per payroll component basis) versus employee-specific, per payroll component, payroll distribution models (see steps 412-418)

Figure 7

| EE ID | Code 4 | Code 18 | Code 22 | Code 24 | 25 | Code 27 | Code 29 | Code 31 | Code 32 | Code 38 | 42 | Code 46 | 51 | 54 | Code 127 |
|---|---|---|---|---|---|---|---|---|---|---|---|---|---|---|---|
| 12345 | 530.28 | 3679.38 | 1154.28 | 281.48 | 0 | 53.36 | 2525.1 | 228.12 | 228.12 | 3679.38 | 0 | 195.09 | 0 | 0 | none |
| 12346 | 560.43 | 3856.20 | 1158.55 | 288.32 | 0 | 53.35 | 2585.21 | 238.46 | 238.46 | 3856.20 | 0 | 210.17 | 0 | 0 | none |
| 12347 | 565.40 | 3862.40 | 1159.34 | 289.21 | 0 | 53.35 | 2585.21 | 238.42 | 238.42 | 3862.40 | 0 | 212.15 | 0 | 0 | none |
| 12348 | 430.55 | 3102.75 | 980.65 | 245.47 | 0 | 53.35 | 2524.75 | 203.33 | 203.33 | 3102.75 | 0 | 195.09 | 0 | 0 | none |
| 12349 | 530.28 | 3679.38 | 1313.5 | 281.47 | 0 | 53.35 | 2365.88 | 228.12 | 228.12 | 3679.38 | 0 | 353.96 | 0 | 0 | none |
| 12350 | 560.43 | 3856.20 | 1158.55 | 288.32 | 0 | 53.35 | 2585.21 | 238.46 | 238.46 | 3856.20 | 0 | 210.17 | 0 | 0 | none |
| 12351 | 430.55 | 3102.75 | 980.65 | 245.47 | 0 | 53.35 | 2524.75 | 203.33 | 203.33 | 3102.75 | 0 | 195.09 | 0 | 0 | none |
| 12352 | 430.55 | 3102.75 | 980.65 | 245.47 | 0 | 53.35 | 2524.75 | 203.33 | 203.33 | 3102.75 | 0 | 195.09 | 0 | 0 | none |
| 12353 | 530.28 | 3679.38 | 1154.63 | 281.47 | 0 | 53.35 | 2524.75 | 228.12 | 228.12 | 3679.38 | 0 | 195.09 | 0 | 0 | none |
| 12354 | 530.28 | 3679.38 | 1313.5 | 281.47 | 0 | 53.35 | 2365.88 | 228.12 | 228.12 | 3679.38 | 0 | 353.96 | 0 | 0 | none |

912

914

Vertical Partition

APPLIED ARTIFICIAL INTELLIGENCE TECHNOLOGY FOR DETECTING ANOMALIES IN PAYROLL DATA

CROSS-REFERENCE AND PRIORITY CLAIM TO RELATED PATENT APPLICATION

This patent application claims priority to U.S. provisional patent application Ser. No. 62/817,950, filed Mar. 13, 2019, and entitled "Systems and Methods of Anomaly Detection in Payroll Accounts", the entire disclosure of which is incorporated herein by reference.

INTRODUCTION

Ensuring that a payroll completion is accurate is a challenging task. Historically, the task of auditing payroll runs has been very labor intensive process, where quite a few of the steps are manual and require individuals with many years of experience. When a paycheck is considered, on average there are 20 items to examine to see if the current check is correct or in error. Thus, for large payrolls, scalability becomes a major problem, particularly when it is considered that there is often a relatively short window in which to run a payroll before pay is delivered to payees.

Computerized systems have been developed to automate aspects of payroll auditing, but the inventors believe that the conventional computer systems in the art for payroll auditing are technically deficient in that they do not scale well for handling large numbers of paychecks and/or they suffer from limited accuracy in detecting anomalies within payroll data. There are two types of errors that hinder the accuracy and reliability of conventional computer systems in this regard—(1) false positives, where the computer system flags a payroll record as being anomalous even though a close review of that payroll record by a payroll analyst concludes that the payroll record is, in fact, accurate, and (2) false negatives, where the computer system fails to flag incorrect payroll records as being anomalous. If a system produces too many false positives, scalability is a problem because payroll analysts become overloaded with payroll records to further examine. If a system produces too many false negatives, it is simply unreliable.

FIG. 1 shows an example of a conventional computer system that applies defensive queries to payroll data in an effort to detect payroll data that merits further review. With this approach, a computer system runs a plurality of defined queries on payroll data in a database to detect predefined scenarios that analysts have seen in the past. Records that satisfy the query conditions are returned by the computer system and can then be passed to a payroll analyst for review. The approach of FIG. 1 does not scale well to large sets of payroll data. For example, the payroll data may include millions of potential rows to review, and the coarse filter provided by the defined queries may quickly overload a pool of analysts. Furthermore, the queries are limited in that inevitably they are focused on detecting scenarios encountered in the past as problematic and do not have a capability of finding anomalies that an analyst did not know how to define in advance. Moreover, the conditions defined by the queries impose hard constraints on threshold testing, etc. (e.g., checking against defined thresholds of large dollar amounts such as $1,000, $5,000, $10,000, etc.) that may miss smaller scale anomalies that can nevertheless be problematic. Thus, the conventional approach of FIG. 1 can be problematic in that it may produce too many false negatives. Further still, if the defined conditions for the defensive queries are not carefully calibrated, the conventional system of FIG. 1 may also produce too many false positives.

For large payroll data sets, the number of paychecks in a pay period may include, as an example, one million the manual process breaks. Sampling approaches can be used by conventional payroll systems to pull a representative sample of payroll records from the large set of payroll data and then test the payroll records in the sample for anomalies. FIG. 2 shows an example of such a sampling approach. However, the inventors believe that the sampling approach also suffers from a number of drawbacks. While it is potentially more scalable than the defensive query approach of FIG. 1, it can suffer from accuracy problems—particularly for payrolls with high variations in pay from payee to payee. When the payroll data has a high variation from payee to payee, defining one or more representative samples can be challenging, and it is believed that many payroll anomalies will be missed. Furthermore, even with rigorous sampling, the computer system of FIG. 2 will not be able to detect payroll anomalies within the payroll records that do not manifest themselves in the samples. Accordingly, the sampling approach of FIG. 2 is also believed to suffer from too many false positives and false negatives.

As a technical advancement in the art, the inventors have developed artificial intelligence technology that is capable of creating highly personalized, history-based, pay distribution models that support highly efficient testing of payroll records for anomalies as compared to those models. Rather than employing a one-size-fits-all statistical model for comparison against current payroll records, example embodiments described herein can generate different statistical models for different payees that take into account the normal variations and fluctuations that may exist within the payee's pay history. Accordingly, the artificial intelligence technology described herein serves as a practical application of statistical modeling and analysis techniques to improve how computers are designed for detecting anomalies within payroll data through highly accurate customized comparisons at a granular per payee level. The risk of false negatives as well as the creation of an undue amount of false positives can be greatly reduced through the use of such personalized pay distribution models as the benchmark for detecting anomalies within payroll records.

Further still, a different pay distribution model can be generated for each payee with respect to each pay component of the payee's paycheck. As noted, most paychecks have a number of pay components, and there may be 50 or more separate pay components that are represented in a payroll record for a payee. These pay components can include values for categories such as gross pay, net pay, federal withholding, various federal, state and local taxes, overtime, etc. The computer system can then compare the values for each of these pay components for a payee against the payee-specific, pay component-specific, pay distribution model to detect whether any anomalies exists within such pay components. As an example, the payee-specific, pay component-specific, pay distribution models can be built around computed averages and variances (e.g., means and standard deviations) for values of the subject pay component within a history of payroll data for the subject payee. The baseline for establishing a normal pay component can then be as simple as the modeled average and variance coupled with a normal distribution curve, where distance from the average can be the parameter that defines the bounds of what is considered normal/non-anomalous. For example, a pay distribution model for Payee 1 and Pay Component A may include (1) a first data value that represents a computed mean for the values of Pay Component A within a defined history (e.g., the prior 3 months) of payroll records for Payee 1, and (2) a second data value that represents a computed standard deviation for the values of Pay Component A within a defined history (e.g., the prior 3 months) of payroll records for Payee 1. The anomaly detection process can presume a normal distribution of values, and the computer system can check whether the current value of the subject pay component for the subject payee varies from the computed mean for the subject pay component and payee by more than a defined number of the computed standard deviations for the subject pay component and payee.

According to another aspect of example embodiments, the payroll anomaly detection technology described herein can be self-improving. As new anomaly detections are performed with respect to new pay periods, updated pay distribution models can be computed from the new pay history so that the pay distribution models will naturally evolve over time to take into account progressions in pay for payees (such as those arising from promotions, etc.). Moreover, by using statistical modeling techniques, thresholds that are used in comparison operations need not be hard coded, and their values can naturally evolve along with the normal fluctuations and variations in pay history.

Example embodiments described herein are also highly scalable and permit payroll records for an entire population of payees to be individually analyzed as against their corresponding pay distribution models to detect anomalies within the payroll records. Thus, not only can example embodiments produce detection results with greater accuracy than conventional systems, but example embodiments can also perform such accurate anomaly detection across 100% of a payee population. Accordingly, it should be understood that the technical improvements wrought by the example embodiments described herein can do what conventional computer systems cannot do—deliver highly scalable and automated, accurate payroll anomaly detection across large numbers of payroll records. Such anomaly detection systems can remove the need to work from samples as well as vastly improve the detection of payroll errors and limit the amount of time trained professionals need to examine payrolls to ensure their correctness.

These and other features and advantages of the disclosed embodiments, as well as the structure and operation of various elements of the disclosed embodiments, are described in detail below with reference to the accompanying drawings.

BRIEF DESCRIPTION OF THE DRAWINGS

FIG. 6 shows an example set of payroll records.

FIG. 7 shows an example set of payee-specific pay distribution models for comparison with pay components of the subject payee's payroll record for the current pay period.

FIGS. 9A and 9B show example partitions of payroll matrix data for higher efficiency processing.

Figure 10:
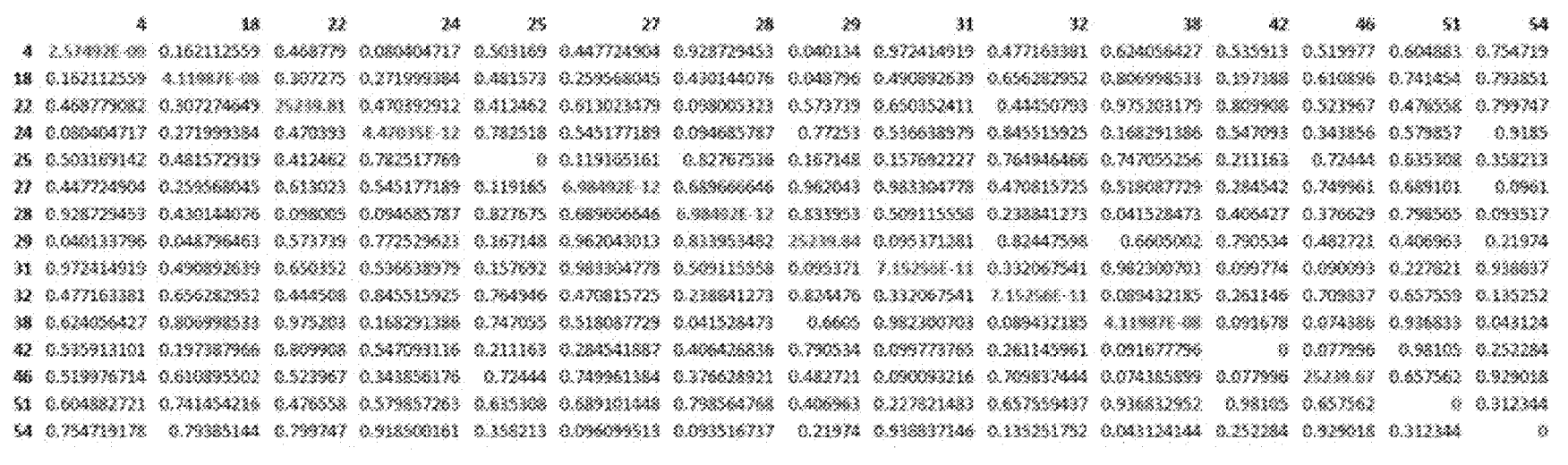

FIG. 10 shows an example covariance matrix for use in a multivariate approach to anomaly detection.

DETAILED DESCRIPTION OF EXAMPLE EMBODIMENTS

Figure 3:
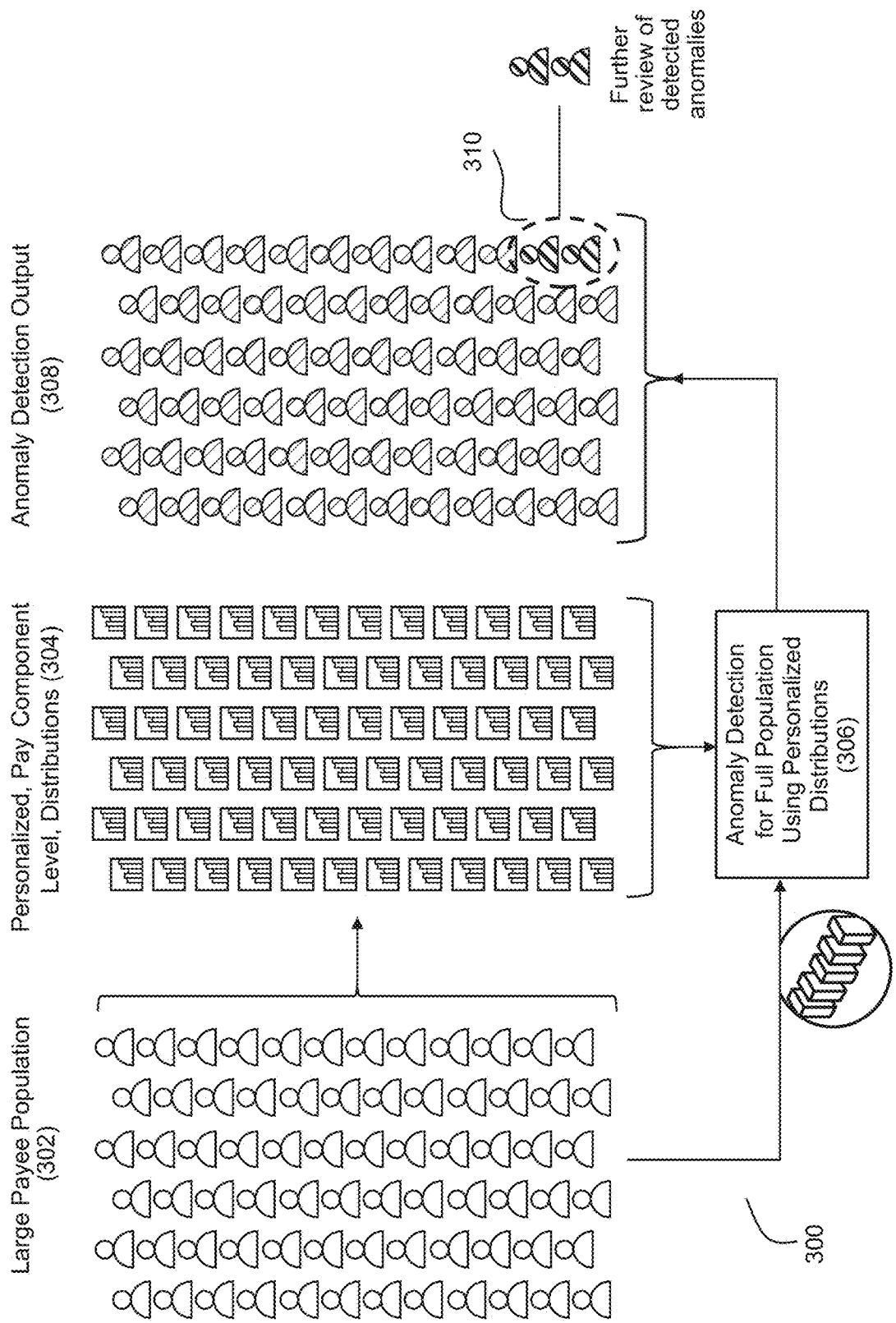
FIG. 3 shows an example embodiment of a statistical approach to payroll detection that uses highly personalized payroll distribution models to detect payroll anomalies within the payroll records of large number of payees.

FIG. 3 shows an example embodiment of a computer system 300 that employs artificial intelligence (AI) to automate the detection of payroll anomalies within pay data 302. This AI employs a statistical approach to payroll detection and uses highly personalized payroll distribution models to detect payroll anomalies within the payroll records of large number of payees. Pay data 302 comprises payroll records for a large payee population. For example, pay data 302 may include payroll records for more than 5,000 payees. For many payee populations, there will be a high variation in pay from payee to payee. As used herein, the term "payee" refers to any person or entity that is a recipient of pay from a payor. An example of a payee is an employee, and an example of a payor is an employer (e.g., a company). However, it should be understood that a payee need not necessarily be an employee of a company. Other examples of payees could be partners, owners, members, independent contractors, etc. Thus, while many of the discussions below will refer to payroll records for employees for purposes of illustration, it should be understood that the payroll records need not necessarily be for just employees, and could be for other types of payees. Also, pay data 302 need not be limited to payroll records for a single payor; for example, pay data 302 may include payroll records for a plurality of different companies. The payroll records for each payee within pay data 302 can be associated with a payee identifier (e.g., an employee ID or other suitable identifying information for payees) to permit the system 300 to analyze payroll records on a payee-specific basis. Each payee can further be associated with other information such as job classification, location, etc. that would permit the payroll records to also be analyzed at higher levels if desired by a practitioner. Each payroll record can break down pay data for each payee on a per pay period basis according to a number of different pay components (e.g., gross pay, net pay, state/federal withholdings, etc.). Examples of payroll records are further discussed below.

Personalized distribution data 304 can be generated from the pay data 302. Distribution data 304 comprises a plurality of distribution models, and each distribution model within the distribution data 304 can be a statistical representation of a pay distribution for a given payee over a defined history of payroll records for that payee. Moreover, each model 304 can be pay component-specific. Thus, if a given payee has 10 pay components to his or her pay, the distribution data 304 can include 10 different pay component-specific distribution models. The distribution model for a given pay component and payee within the distribution data 304 can be a statistical representation of a pay distribution for that pay component over a defined history of payroll records for that payee. For example, each pay distribution model can be represented by an average and variance for the subject pay component within the defined history. The pay distribution models within distribution data 304 can serve as references or benchmarks of what is considered to be normal pay for each payee. Examples of such pay distribution models are further discussed below.

One or more processors can then perform an automated anomaly detection process 306 for each payee with respect to a pay period (e.g., the current pay period) within the payee population of pay data 302 using the personalized distribution data 304. For example, the payroll records for a current pay period can be analyzed to determine whether any anomalies are present before approving those payroll records for payment to the payees. As part of this analysis, a processor compares the current pay period payroll record for a given payee to the pay distribution model(s) for that payee within the pay distribution data 304 and determines the probability that a given payroll record contains an anomaly. For this analysis, a particular pattern of pay distribution (such as a normal pay distribution based on pay history) can be assumed, and if a current pay value is sufficiently close to the center of the modeled distribution pattern, then the computer system can conclude that the current pay value is non-anomalous; but if the current value is too far into the tail at either end of the modeled distribution pattern, then the computer system can conclude that the current pay value is anomalous. As noted above, this comparison/analysis can be on a pay component-specific basis using personalized, pay component level, pay distribution models for the subject payee. This comparison would be performed for each payee in the payroll records for the current pay period. Examples of how this analysis can be performed are discussed below.

Figure 1:
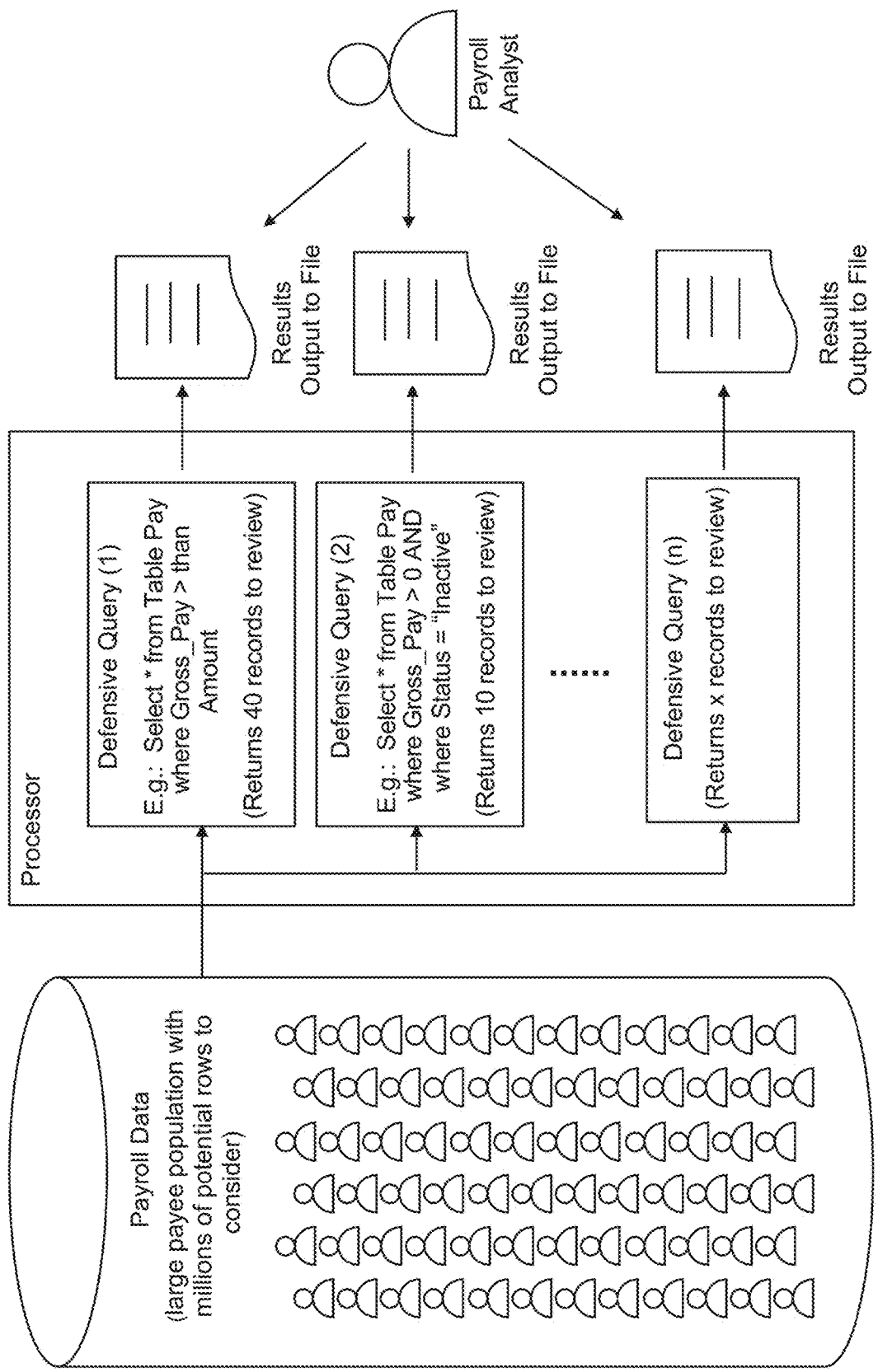
FIG. 1 shows a conventional computer system that employs defensive queries to identify payroll anomalies.
Figure 2:
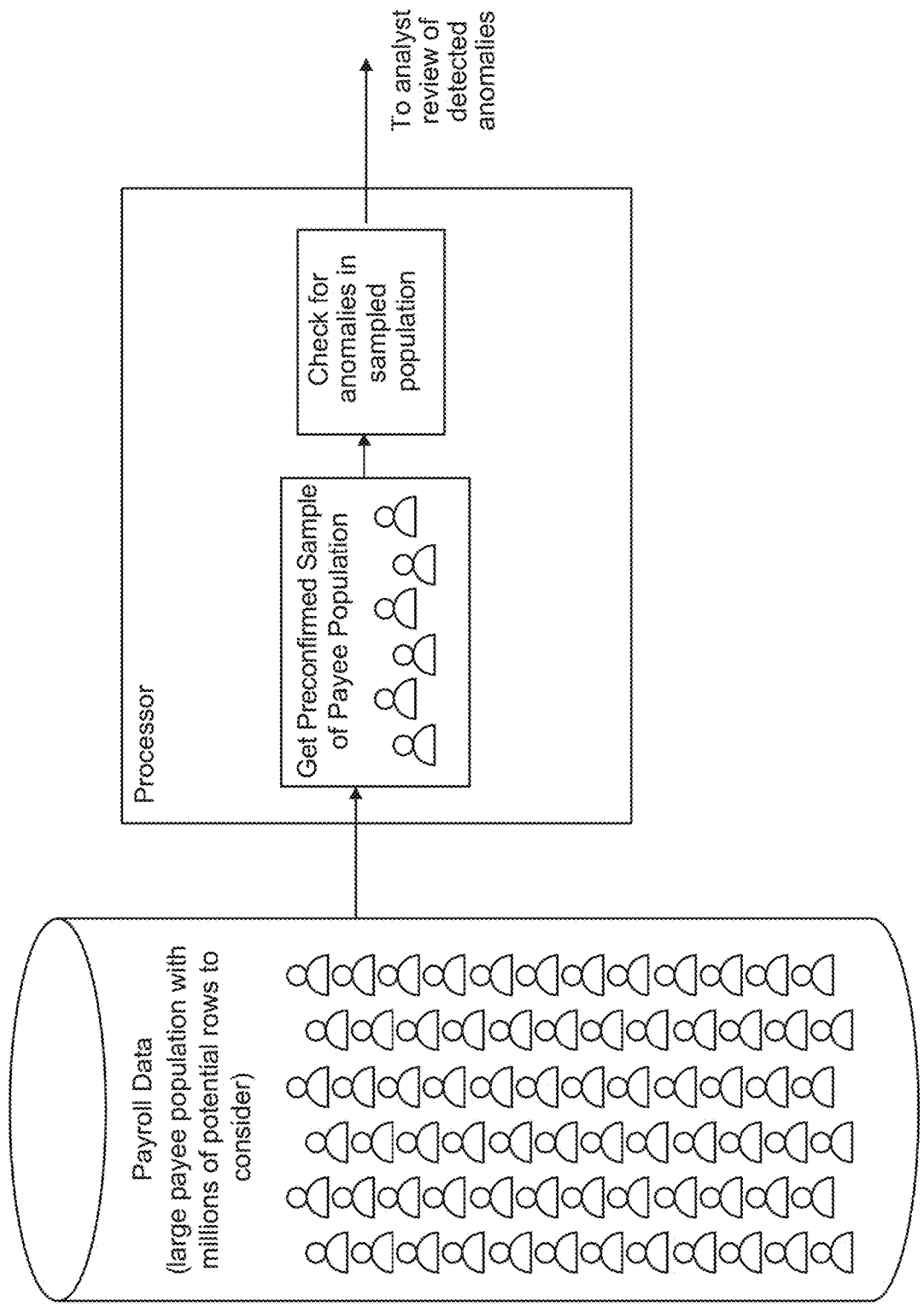
FIG. 2 shows a conventional computer system that uses a sampling approach to identify payroll anomalies.

Execution of the anomaly detection process 306 produces anomaly detection output 308. The anomaly detection output 308 can record, for each payee in the current pay period, whether any of the current pay period payroll records contain any anomalies. Payroll records with detected anomalies (see 310 in FIG. 3) can be flagged for further review/analysis. This further review/analysis can be another layer of automated review by the computer system 300 and/or it can be manual review by one or more payroll analysts via user interfaces. As an example, the computer system 300 may be configured to apply business rules against the detected anomalies 310 to further determine if any of the detected anomalies are false positives before reporting the any remaining detected anomalies to a payroll analyst for further review via a user interface. As another example, each detected anomaly 310 could be reported out through a user interface for payroll analyst review. In either event, due to the AI approach to payroll anomaly detection described herein, the workloads placed on payroll analysts are expected to be much more manageable than with the conventional computer systems of FIGS. 1 and 2 while also achieving high accuracy across the full payee population.

Figure 4:
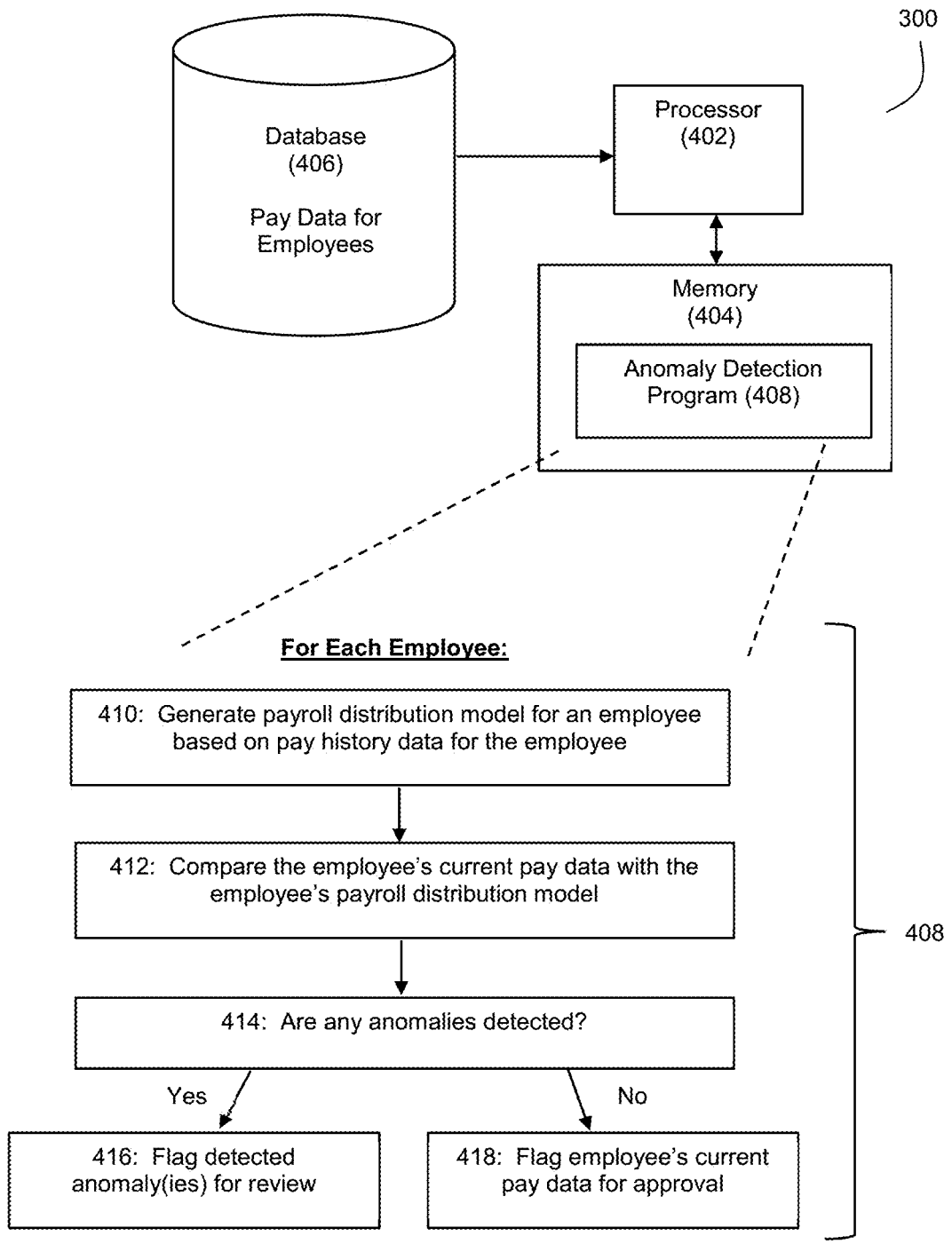
FIG. 4 shows an example embodiment of a computer system for executing an anomaly detection program with respect to payroll data using techniques shown by FIG. 3.

FIG. 4 shows an example embodiment for computer system 300 of FIG. 3. The computer system 300 may include a processor 402 and associated memory 404. The computer system 300 may also include a database 406 that stores the pay data for employees. It should be understood that the processor 402 can be any suitable processor for carrying out the operations described herein. For example, the processor 402 can be a general purpose processor (e.g., a CPU). As another example, the processor 402 can be a graphics processing unit (GPU). As discussed below, the use of a GPU as processor 402 may improve performance. Furthermore, processor 402 may include a plurality of processors such as in a distributed computing network (e.g., a cloud network) where the various tasks for execution may be distributed across multiple processors if desired by a practitioner. Such multiple processors can include processors of different types (e.g., combinations of general purpose processors with GPUs). Similarly, memory 404 may be multiple memories distributed across a network, and database 406 can be multiple distributed databases, if desired by a practitioner. Database 406 may be included as part of a payroll system/platform, and where the processor 402 can communicate with database 406 via a network interface.

Memory 404 can be a non-transitory computer-readable storage medium in which an anomaly detection program 408 is stored, and anomaly detection program 408 may comprise a plurality of instructions that are executable by processor 402. Thus, processor 402 can then execute the anomaly detection program 408 to detect anomalies within the payroll records stored by database 406.

FIG. 4 also shows an example process flow for the anomaly detection program 408. This process flow can be performed on a per employee basis for each employee within the payroll records maintained by database 406.

At step 410, the processor processes payroll records within database 406 for the subject employee and generates a payroll distribution model for that employee based on a pay history for that employee as reflected within the processed payroll records. Practitioners can choose an appropriate duration for the pay history based on their preferences, where longer pay history windows may potentially include stale pay history data that no longer reflects normal, current conditions for the subject employee, while shorter pay history windows may potentially lack enough depth to capture the normal current pay behavior for the subject employee. An example, the pay history window can go back 3 months (e.g., a quarterly history), but other windows could readily be employed. For example, in another instance, the history window can include the first paychecks in a bimonthly cycle for several months of same month year-over-year (for a defined number of years). As another example, the history window can vary based on the time of year. For example, for a company that often pays yearend bonuses, the history window for December or January may use prior paychecks from December or January for establishing the normal baseline (for one or more of the pay components).

FIG. 6 shows an example data structure 600 that can serve as payroll record data within a pay history for an employee. Each payroll record for an employee can be a row in the data structure 600 shown by FIG. 6, and each row can be associated with a date for that payroll record (e.g., the date on which the pay was remitted to the subject employee). The record can further comprising a plurality of fields, where each field is associated with a different pay component and populated with data values for the associated pay component. Data structure 602 in FIG. 6 shows an example set of pay components, where each pay component has an associated paycode (Component ID) and component name. Examples of pay components can include federal withholding, gross pay, total employee taxes, total employer taxes, net pay, etc. as indicated by the pay code table data structure 602. It should be understood that the set of pay components depicted by 602 in FIG. 6 is an example only; more or fewer pay components may be used by a practitioner depending on the details of a particular use case. Various columns in the payroll record data structure 600 can be associated with different paycodes, and their fields are populated with data values for the pay component of the employee's pay that is attributable to the associated paycode/pay component. Also, it should be understood that the payroll records within data structure 600 may include additional fields not shown by FIG. 6. For example, fields can be included for identifying the subject employee (e.g., Employee ID, name), a job category for the subject employee (e.g., job title or code, etc.), and/or a location for the subject employee (e.g., Chicago office, etc.).

FIG. 7 shows an example employee-specific pay distribution model 702 that can be generated for an employee. As discussed above, the personalized pay distribution model can include a plurality of pay component-specific models, and FIG. 7 shows an example of this. With FIG. 7, each row of the employee-specific pay distribution model 702 can be an employee-specific, pay component-specific, pay distribution model. Each row of model 702 can include a plurality of fields, such as a field 704 that identifies the applicable pay component. Each row of model 702 may also include a field 706 that identifies a mean (mu) for the data values within the applicable pay component of the payroll history analyzed by the processor at step 410. Each row of model 702 may also include a field 708 that identifies a standard deviation (σ or sigma) for the data values within the applicable pay component of the payroll history analyzed by the processor at step 410. Each row of model 702 may also include a field 710 that identifies a tolerance that may be used when assessing whether a value for the applicable pay component within the subject employee's payroll record for a current pay period is anomalous. It should be understood that model 702 may be associated with additional fields, such as a field for identifying the subject employee (e.g., an Employee ID field). Through the mean and standard deviation fields 706, 708, the model 702 can serve as a statistical representation of a pay distribution for the subject employee that is deemed to be "normal". The values for fields 706 and 708 can be computed from the payroll records within the employee's pay history that is used at step 410 (e.g., the mu value in field 706 for pay component Code 4 can be the computed mean of the values that populate the fields for Code 4 in data structure 600 for the subject employee). While the example of FIG. 7 uses a mean as a component of the model, it should be understood that other statistical summarizations of payroll data could be employed, such as a median of the payroll data values.

Figure 8:
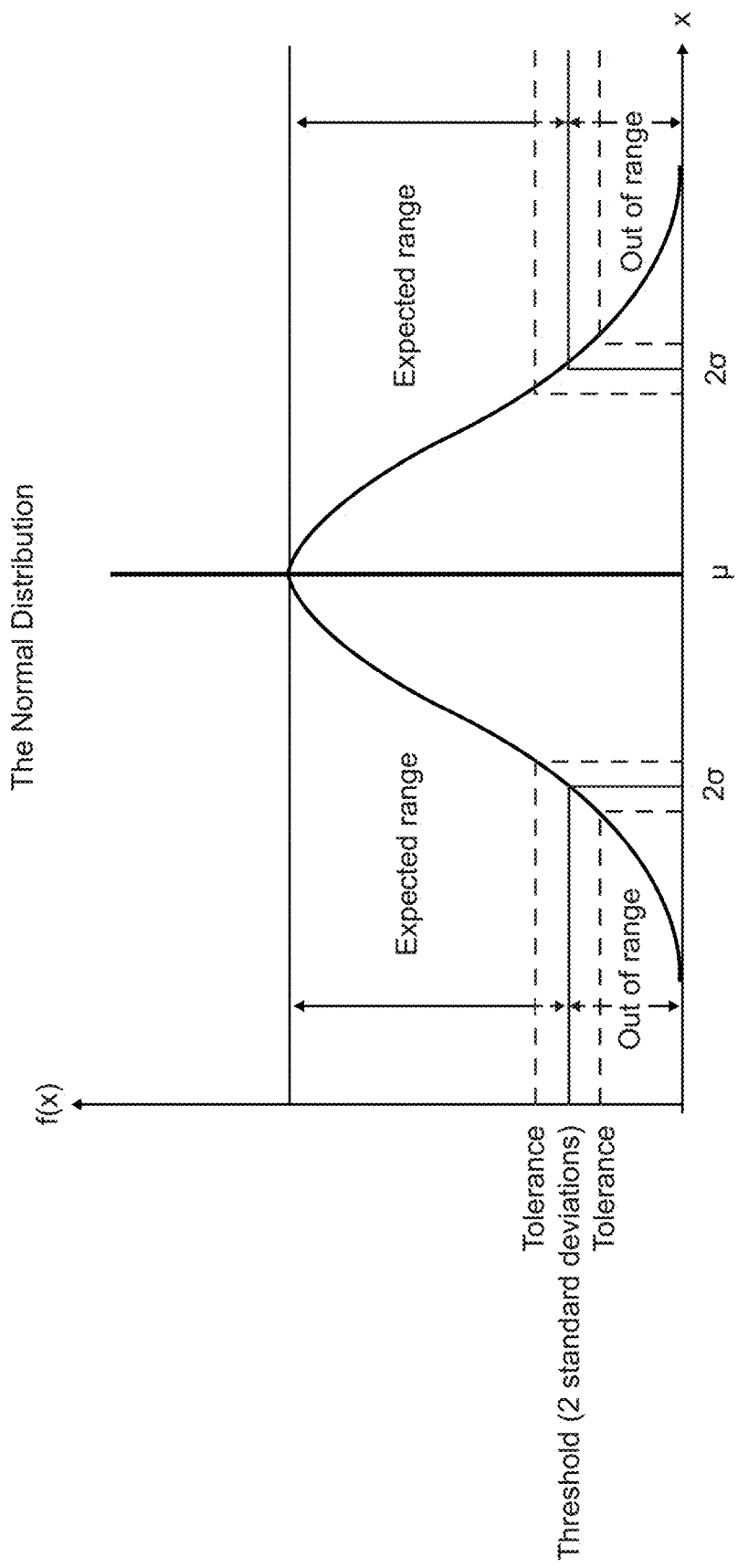
FIG. 8 shows an example normal distribution of pay component values for use with the anomaly detection program.

Returning to FIG. 4, at step 412, the processor compares the employee's current pay data with the employee's payroll distribution model. FIG. 7 shows an example of this comparison, where data structure 700 can represent the employee's current pay data. This data structure 700 may comprise a plurality of data values that are associated with and represent that various pay components that make up the subject employee's pay. Each payroll component value from data structure 700 can then be compared with the corresponding pay component-specific pay distribution model from model 702 (see 750 in FIG. 7). This comparison can presume a normal distribution of data values for the subject pay component as reflected by FIG. 8. The expected pay range can be data values that are within a defined number of standard deviations from the mean (μ). For example, the defined number of standard deviations can be 2 standard deviations (2σ). Although it should be understood that numbers other than 2 could be used (e.g., 1, 1.5, 3, etc.) depending on the desires of a practitioner. The defined number of standard deviations can be used to define a threshold for determining whether a current pay component value is anomalous or not. Furthermore, if desired by a practitioner, the value in tolerance field 710 can build a further buffer around this threshold as indicated by FIG. 8. In the examples of FIGS. 7 and 8, the tolerance values in column 710 can be scalar multipliers to be applied to the thresholds derived from the sigma values in column 708. For example, if the threshold is 2 standard deviations, then the tolerance can build in a buffer around that threshold such that a 1.1 value for the tolerance in column 710 would provide a 10% positive buffer to the 2 standard deviations threshold (meaning that values within 10% greater than 2 standard deviations would still be considered ok/normal.

To perform the pay component comparisons of step 412, the processor can (for each pay component) calculate the probability of the current value being anomalous given the modeled normal distribution from 702 ((N(mu, sigma)) for the subject pay component according to the following formula for a univariate normal distribution, $$p(x) = \frac{1}{\sqrt{2\pi}\sigma} \exp\left(-\frac{(x-\mu)^2}{2\sigma^2}\right).$$

Here the only model parameters to learn are the mean and variance for each pay component (and where x is the current pay component value from 700) The processor can also compute the value for the threshold as p(mu+2*sigma). If the calculated p(x) is greater than p(μ+2σ), then the processor can conclude that the current value for the subject pay component is anomalous and flag the subject payroll record accordingly (see steps 414 and 416 in FIG. 4). If the calculated p(x) is not greater than p(μ+2σ), then the processor can conclude that the current value for the subject pay component is normal and flag the subject payroll record accordingly (see steps 414 and 418 in FIG. 4). Optionally, the processor may further build in a buffer for this threshold comparison using the applicable value of tolerance 710 for the subject pay component from 702.

While the discussion above for step 412 describes the comparison process being performed according to a univariate approach (where each pay component is evaluated individually), it should also be understood that a practitioner may also design the computer system to examine the paycheck as a whole under a multivariate approach. To examine the check as a whole under this scenario, each pay component can be considered an independent normally distributed random variable with its own mean and variance. The test at the aggregate paycheck level can use the multivariate normal $$p(X) = \frac{1}{\sqrt[n]{2\pi}|\Sigma|^{1/2}} \exp\left(-\frac{1}{2}(X-\mu)^T \Sigma^{-1}(X-\mu)\right)$$

for n dimensions with n×n dimension covariance matrix Σ and the vector of length n, μ. In this example, the models 702 for multivariate analysis can use a covariance matrix for sigma 708 and use a vector of means for mu 706. FIG. 10 shows an example of a covariance matrix for use in this regard. The covariance matrix represents the shared relationship between the various pay components of a pay history for an employee. The diagonal that runs from the upper left to the lower right of FIG. 10 is the variance (σ²) of a given pay component, and the off diagonals are the correlation values (−1,1) between respective pay components as indicated by the row and column labels. This approach can computationally costly due to inverting the covariance matrix. However, it may be the case that the number of dimensions can be reduced due to collinearity, which can be detected using the moment matrix $X^TX$ which will have no inverse. A practitioner may find that resorting to the pseudo-inverse is sufficient given the volume of data. Additionally, while the multivariate analysis would not identify with particularity which component of a paycheck is abnormal, it is capable of detecting situations where there is an abnormality in the relationship between values of different components of a paycheck. Accordingly, if a practitioner chooses to implement a multivariate analysis as part of step 412, this can permit the system to detect situations where the values of the pay components themselves are not abnormal, but the relationship between the values of different pay components is abnormal (e.g., where the tax component of an employee's paycheck did not increase as expected for an increase in the employee's gross pay, which could manifest itself in a situation where the employee's gross pay increased 10% (which was deemed normal based on a per gross pay basis in view of the modeled history of the employee's gross pay), but a tax component of the employee's pay stayed the same (and thus was deemed normal on a per component analysis due to the zero change relative to history) which would be abnormal for the given increase in gross pay.

Payroll records that are flagged as anomalous at step 416 can then be further analyzed by business rules and/or forwarded to a payroll analyst for further review. To facilitate review by a payroll analyst, a user interface (such as a graphical user interface (GUI)) can identify the payroll record flagged as anomalous and highlight the pay component(s) deemed anomalous. Such a GUI can also show the model used for the anomaly detection as well as a window of prior pay history for the subject employee to facilitate the analyst's review.

As noted, the steps 410-418 of FIG. 4 are performed for each employee with a payroll record for the current pay period so that computer system 300 is able to perform the anomaly detection process across an entire payee population if desired.

Figure 5:
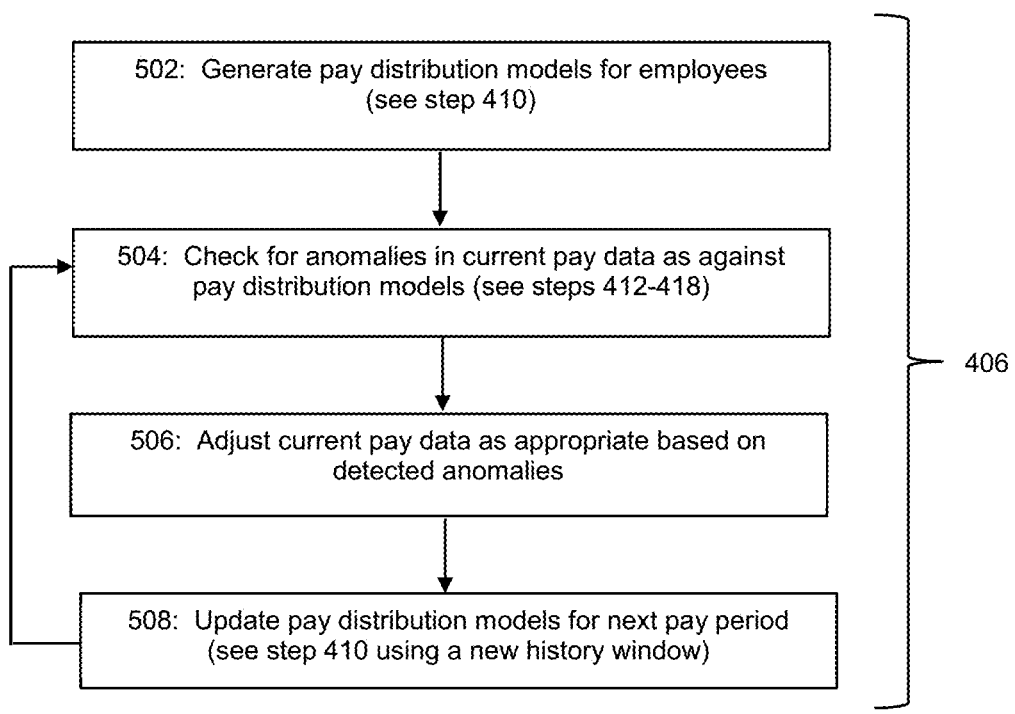
FIG. 5 is an example process flow that depicts a self-learning aspect of the anomaly detection program.

Moreover, by using a sliding window of history data for the computed models 702, the anomaly detection process is self-learning and self-improving so that as an employee's pay history naturally evolves over time (e.g., as raises are earned), the AI will be able co-evolve and reduce the risk of triggering false positive anomalies. FIG. 5 is a process flow that demonstrates an example of how such self-learning/improving can be achieved. In this regard, the AI anomaly detection program 408 can be considered as providing machine learning for the computer system 300. At step 502, the processor generates the personalized payroll distribution models 702 for the employees (see step 410 in FIG. 4 discussed above). At step 504, the processor checks for anomalies in current pay data as against the models (see steps 412-418 in FIG. 4 discussed above). If anomalies are found as a result of step 504, one or more of the anomalous payroll records may be adjusted to correct any errors therein (step 506). The corrected payroll records can then be flagged as non-anomalous (or can be re-tested for this purpose). Also, if a payroll record that was flagged as anomalous as a result of step 504, but then later cleared as being ok as a result of further review/analysis, then the computer system may also flag such payroll records as being non-anomalous if desired by a practitioner. At step 508, the processor updates the pay distribution models for the next pay period by adding the just completed pay period to the history used for model generation at step 410. If desired, this adjustment of the window for payroll history data may also drop out the oldest payroll records from the history window, although this need not be the case. These updated models allow the computer system to self-learn from the natural evolutions that may results in changes to an employee's paycheck over time. Accordingly, it should be understood that the statistical models that serve as the baseline for anomaly detection are not static and instead can evolve over time, to thereby make the anomaly detection process highly flexible.

To facilitate the computerized analysis by the AI computer system 300, the payroll records can be converted into a matrix for efficient manipulation by the processor 402. Payroll data loaded into database 406 and/or retrieved from database 406 can be decoded into its components and sanitized prior to processing at step 410 of FIG. 4. For example, data sanitization can include removing personally identifiable information (PII) and/or non-public information (NPI) from the payroll records. The sensitive content can be stripped out and replaced by codes. The codified content and other payroll data can then be mapped into the matrix, where each row is for a specific individual in a specific company. The rows can further organize employees with respect to specific pay types. For example, a pay type classification can distinguish between full time and part time employees, which in some cases could involve an employee being slotted in different companies. This encoding allows for employees to be paid by multiple companies in the same parent company, and they can have a different profile for each company. As indicated by FIG. 6, different columns in the matrix can correspond to different pay components that influence the subject employee's paycheck. For efficiency, a sparse matrix can be used. With a sparse matrix, a significant portion (e.g., a majority) of the elements of the matrix can be zero values. As indicated by FIG. 6, the matrix can contain historical payroll records for employees. Furthermore, the matrix can be sorted into reverse chronological order of pay periods within a defined employee, company, and pay type grouping.

A selection process can be used to determine which items to include in the calculation of the model parameters. For example, if an item was tagged previously as an anomaly, a practitioner may want to configure the system so that it will not be included in the model determination. There can also be other data preparation processes that encode the heuristics used by payroll subject matter experts to get representative data for a person's normal payroll behavior.

The task of building the personalized pay distribution models from the matrix of pay history data can use highly optimized in-memory and highly indexed databases along with massive parallelism. An example of in-memory usage would be cases where random access memory (RAM) is used for data storage as opposed to disk memory (such as with a standard hard-drive) to provide fast access to the data.

For example, one or more GPUs can be used to perform the model generation tasks, where the GPUs can apply massive parallelism to the matrix manipulation/linear algebraic operations that could be used to compute the model parameters. Because the model training does not include the current payroll that is to be evaluated, the task of generating the models (see step 410) can be performed ahead of the time that steps 412-418 would need to be performed. The model parameters can thus be stored in an indexed in-memory database for quick access during actual payroll checking of steps 412-418.

The retrieval of payroll records from database 406 can also include a process for transforming the payroll records into a platform independent format that is recognized by the anomaly detection program 408. This normalization operation can permit the computer system to interact with a variety of potential different platforms where payroll records may be stored. The retrieved content can be stored as-is for historical reference, but is transformed into codes with corresponding values for processing by the anomaly detection program 408. On completion of the data transformation, any paycheck for an individual employee defined with multiple records can be combined into the coded content that the anomaly detection program 408 can work with. For example bi-weekly hourly employees can have two rows in the input format that are to be combined into a single row, then taken apart into codes with the combined values. Another transformation that can be performed is an encoding of the earnings and deduction codes into a bit string. Binary operators can be used to implement fast set operations for union, intersection and set difference. As an example, a new code not previously seen for an employee could be quickly flagged as an anomaly. A mapping of the codes to bit positions can facilitate this. Furthermore, the transformation and encoding operations can be implemented using the Python programming language.

As noted, the use of a matrix to encode the pertinent parts of employees' payroll records enables the use of matrix algebra to efficiently process payroll data for multiple employees concurrently. The use of GPUs, multiple processors, and/or multiple processing cores on multi-core processors permits practitioners to apply massive parallelism to these concurrent processing tasks and thus improve latency and throughput for the anomaly detection process. As an example, the anomaly detection computer system can be implemented in a parallel computing architecture such as those available on cloud networks to reduce computation time and increase throughput. Once the learning and detection matrices are built, each employee can considered independently. Likewise each component of a paycheck can be considered independently. These traits thus optimize the processing time and space to make the anomaly detection process readily amenable for a parallel/distributed computing architecture. For example, an employee, in company A having 20 segments in his or her paycheck can have all 20 segments processed in parallel. The results from each of these separate processing could then be combined to form the holistic picture for the paycheck of the individual in the specific company.

Figure 9A:
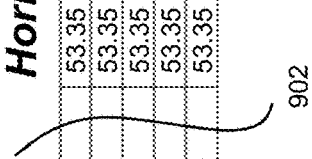

Further still, the matrix to be processed can be partitioned for independent parallel processing of the different partitioned components. For example, horizontal and/or vertical partitioning of the matrix could be employed. As a first example shown by FIG. 9A, horizontal partitioning can be employed where different rows of the matrix are partitioned into blocks 902 and 904 for independent parallel processing. Thus, with the example of FIG. 9A, employees can be partitioned into groups and all of the pay components for a particular employee in that group can be processed independently on a per-employee basis. As another example shown by FIG. 9B, vertical partitioning can be employed where different columns of the matrix are partitioned into blocks 912 and 914 for independent parallel processing. Thus, with the example of FIG. 9B, some pay components for a given employee would be processed as part of block 912 while other pay components for that employee would be processed as part of block 914. It should be understood that the computer system could also employ both horizontal and vertical partitioning if desired. Further still, while the examples of FIGS. 9A and 9B show partitioning into 2 blocks, it should be understood that the matrix could be partitioned into more than 2 blocks if desired by a practitioner.

Figure 11:
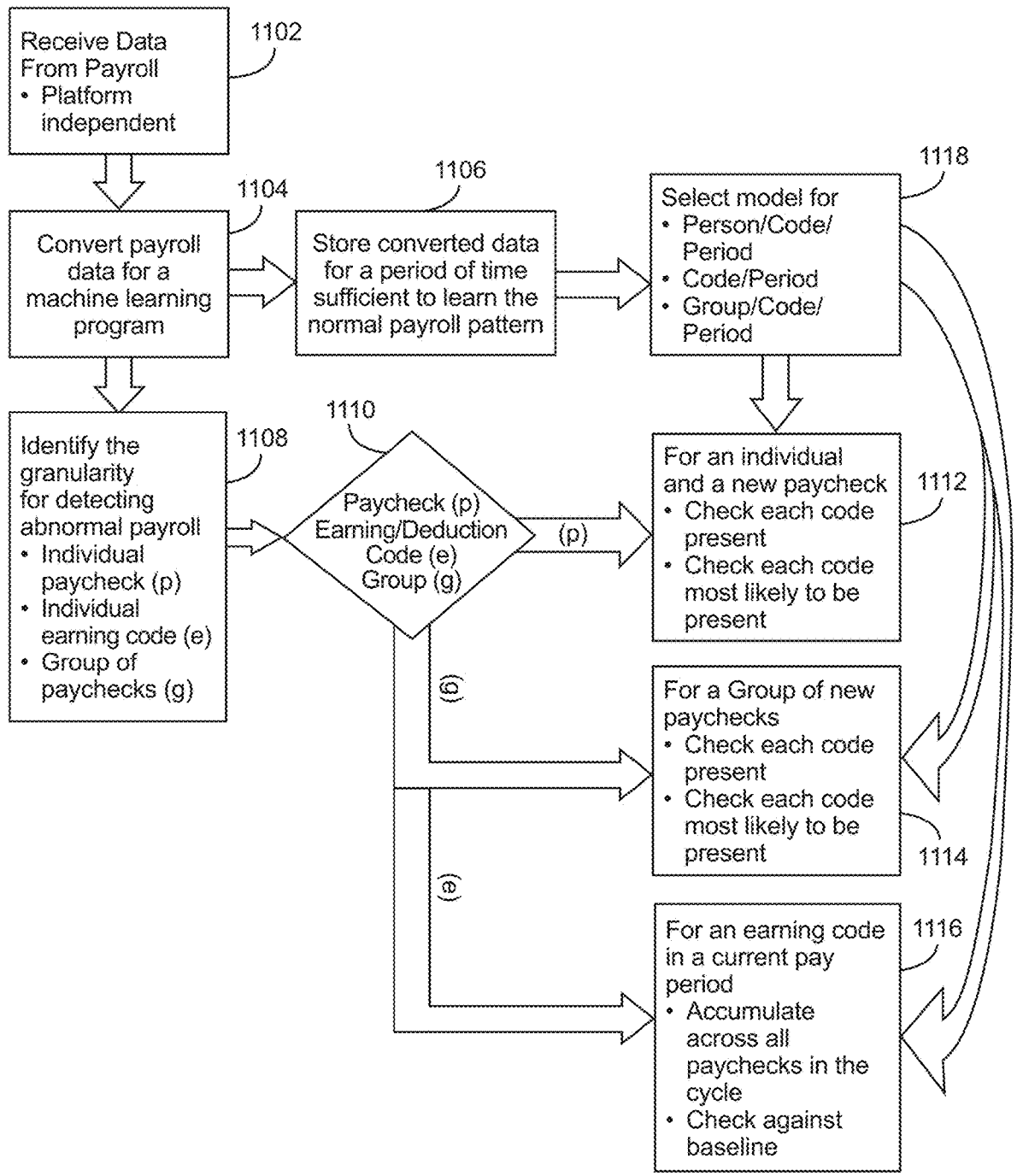
FIG. 11 shows an example flow chart for another example embodiment of payroll anomaly detection.

FIG. 11 shows an example flow chart for another example embodiment of payroll anomaly detection. At 1102, the system receives the payroll data and then encodes/transforms that payroll data to a normalized, platform-independent matrix format (see 1104). At 1106, this converted payroll data is then stored for a period of time sufficient to learn the normal payroll patterns. This can include performing the model generation operations of step 410 on the payroll matrix data.

At 1108, the anomaly detection process can be controlled through a specification that defines the granularity with which the payroll data is analyzed. These specifications may be provided via user input through a user interface such as a GUI. For example, the system can define whether the payroll data is to be analyzed at the individual paycheck level (p) (e.g., per employee), at the individual earning code level (e) (e.g., "check the Code 4 values for the employees"), and/or at a higher level grouping of paychecks (g) (e.g., at a job category level, office location level, etc.). Based on which level of granularity is selected (see 1110), the process flow can branch to any or all of operations 1112, 1114, and/or 1116.

At 1118, the appropriate pay distribution models can be selected for use with applicable operations 1112, 1114, and/or 1116.

For example, for an analysis 1112 at the individual paycheck level p, the models can be on a per employee, per pay component basis for a specified pay period (e.g., the current pay period). The analysis at 1112 can proceed as discussed above with respect to steps 412-418 of FIG. 4. The analysis at 1112 can also determine from the pay history which pay components are most likely to be included as part of the paycheck specified for analysis (and thus flag a paycheck if an expected pay component is missing and/or an unexpected pay component is present).

For an analysis 1114 at the group level g, the models can be on a per group, per pay component basis for a specified pay period (e.g., the current pay period), and the analysis 1116 can check each pay component within the group using the techniques discussed above for steps 412-418 of FIG. 4. This analysis can also check for the presence of expected/unexpected pay components.

For an analysis 1116 at the earning code level e, the models can be on a per pay component basis for a specified pay period (e.g., the current pay period), and the analysis 1114 can check each pay component using the techniques discussed above for steps 412-418 of FIG. 4. This analysis can also check for the presence of expected/unexpected pay components.

To clarify, if there are 50 pay components that ever appear on an employee's paycheck in a specific company in a pay type, then there are at least 50 models that would be used to model that employee as discussed above with respect to FIG. 4. If 500 individuals are combined into a single group g, and collectively there are 150 pay components across the group, then the group would be defined by at least 150 models. Some employers have 300,000 employees; therefore if each paycheck has 20 pay components in one pay types (say, bi-weekly), then the system would learn at least 6,000,000 models to detect anomalies for all the employees of that company in that pay type.

Figure 12:
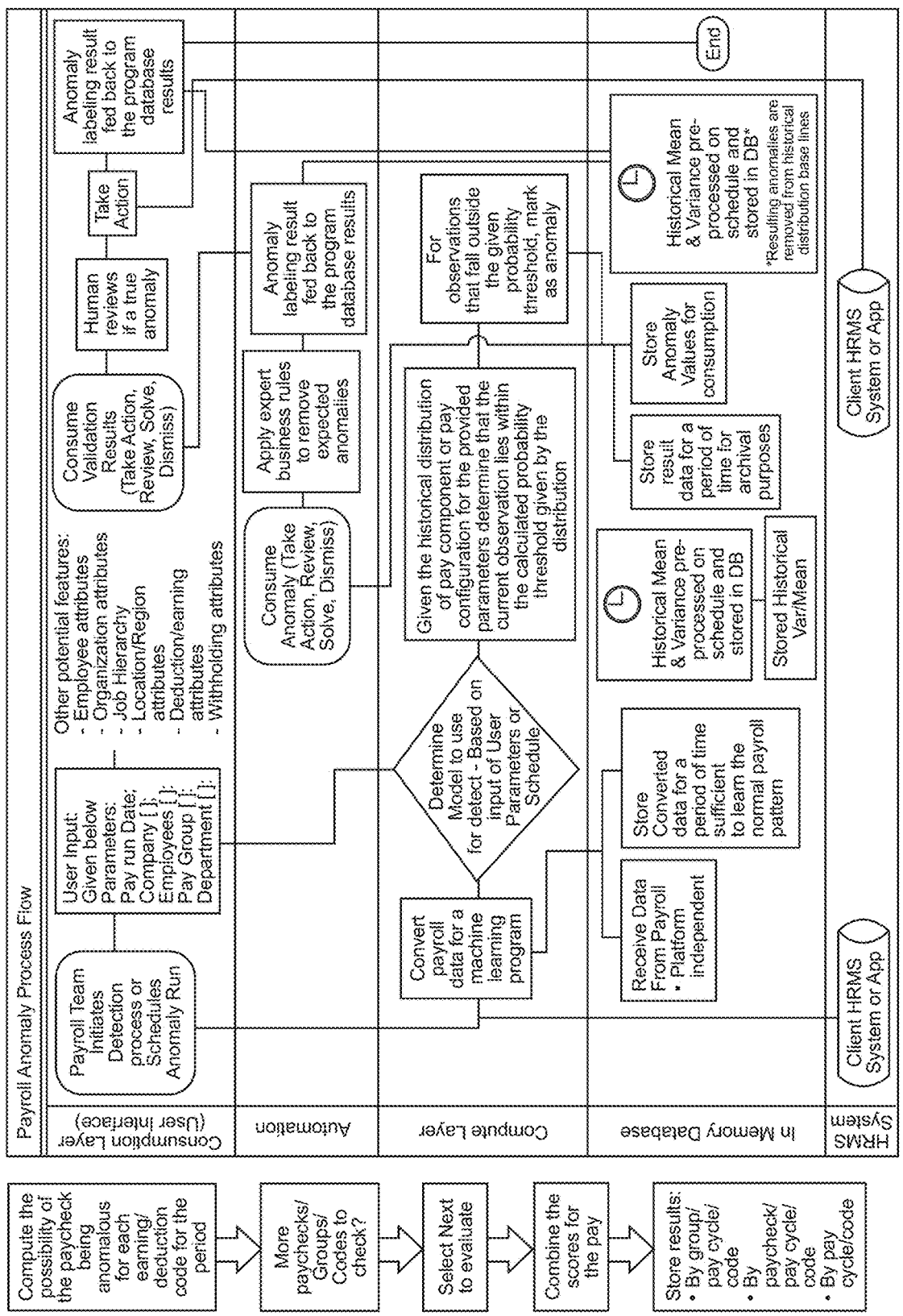
FIG. 12 shows another example flow chart for another example embodiment of payroll anomaly detection.

FIG. 12 shows another example flow chart for another example embodiment of payroll anomaly detection. The process flow in the left part of FIG. 12 shows an example overall process flow for the embodiment. The detailed view in the right part of FIG. 12 shows how the anomaly detection process can be implemented via a computer system that includes a consumption layer (e.g., user interface), an automation layer, a compute layer, an in memory database layer, and a human resources management system (HRMS) layer.

Within the automation layer, marked anomalies from operation of the anomaly detection program within the anomaly detection system can be categorized based on the found result. Applied business rules can be run against these anomalies to further determine if false positives of allowed anomalies are present before reporting true anomaly conditions back to the end user for action.

In conjunction with the anomaly detection, the example of FIG. 12 can also leverage a layer of automated validations based on payroll expertise. The main purpose of this layer can be to reduce the number of known/expected variances that the payroll analysts will be required to look at and expand the scale/consistency in which we can apply the rules.

These validations can be built based on payroll domain expertise, extracted through requirements sessions and coded into a business rules engine. The expert knowledge can be encoded in a way that allows for intelligent decision making using inference. The inputs used to evaluate the rules can come from the anomaly results as well as external sources as may be appropriate (e.g. additional data from HRMS, time systems, client configured/captured data). The business rules engines can be configured by client to allow for customization but use a base set so it is not starting from scratch.

The validation results can be updated to the anomaly database results prior to being displayed to the payroll analyst.

Figure 13:
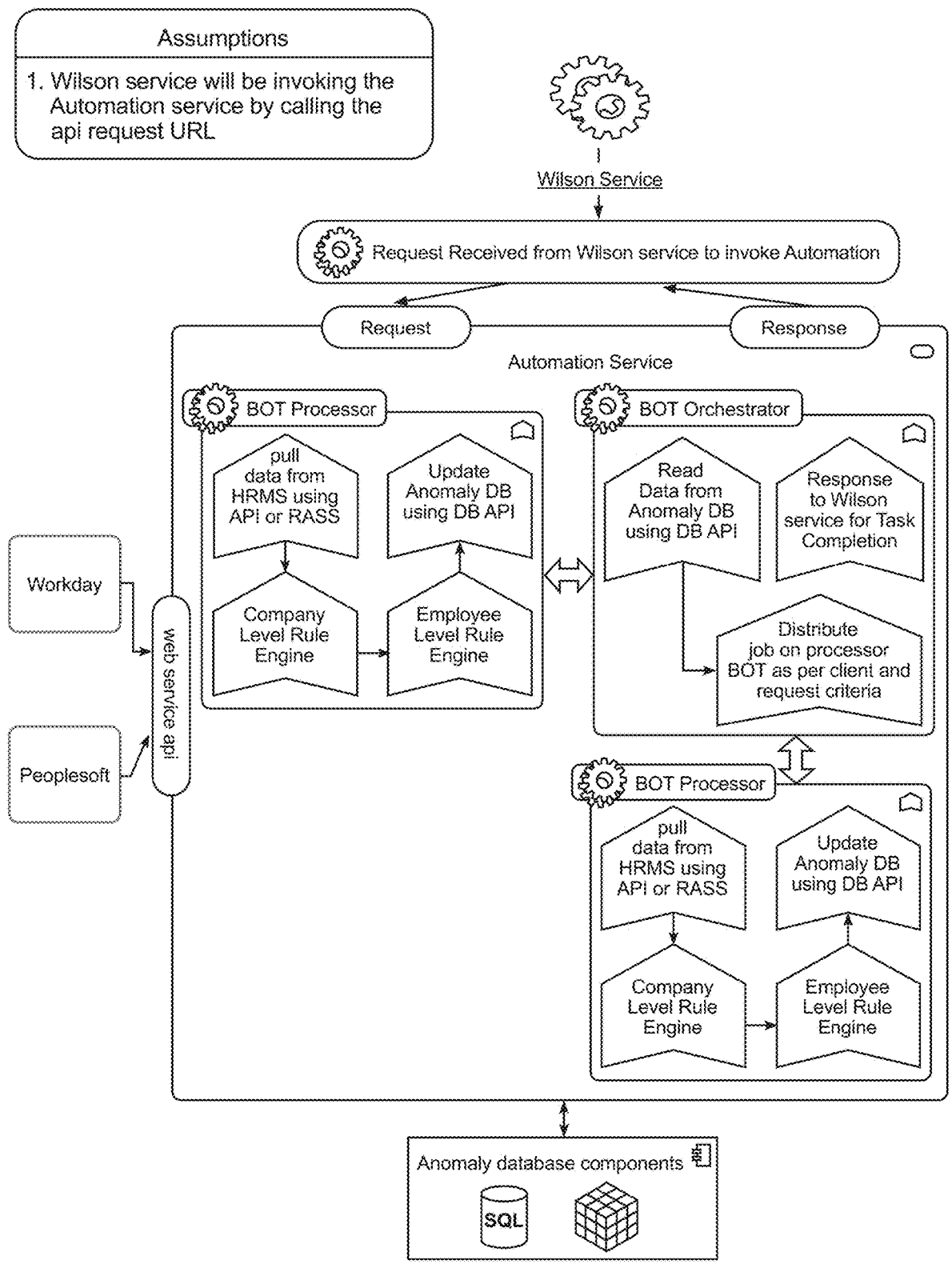
FIG. 13 shows an interconnected flow chart of an automation layer of an example embodiment for an anomaly detection program.

One of the finalizing artifacts from payroll is the pay register. This register is essentially a self-contained database; a dictionary indexed by paycheck date, hashed employee id, hashed company, and pay type (weekly, biweekly, semi-monthly, and monthly). The encoding of the entity "the paycheck" can be done via a series of codes with associated values that can either be strings or decimal numbers. The codes are specific to the system in which the payroll was processed. For example, the coding in Workday can be different from those in PeopleSoft, likewise in SAP, or others (e.g., see FIG. 13).

A standard template for the self-referencing database can be used as the API interface to the payroll system that pulls data into a standard format. This enables cross payroll platform operations. A secure connection is established with the source system and the data will be extracted to the platform that does the anomaly detection.

Once the data arrives on the platform it is decoded into its components, sanitized, and mapped into a matrix as discussed above. Within this matrix is the history for an individual, and pay distribution models can be derived from this history as discussed above. Testing for anomalies on a per code basis can include several steps: (i) a probabilistic test (examples of which are discussed above), (ii) a classification test, and/or (iii) a confidence test. With a classification test, the system can process annotated and labeled historical payroll data and use these labels as an indication whether something is anomalous. An example of machine learning classification in this regard is discussed below. The confidence test can be closely related to the probability distributions and may employ regression models. The confidence test can indicate, given the estimation of a real value (such as the value of a pay component), whether the estimated mean value falls within a range of values given a predefined level. For example, a 95% confidence interval would indicate that one can be 95% sure that the true mean of a given population falls within an interval.

By default, the anomaly detection process can run at the employee and company level, but the UI can enable a researcher to group individuals either within or across departments to understand their aggregate behavior over time (e.g., see groupings g in FIG. 11). The users can thus be able to see detail and aggregate data grouped by company, pay groups, employee type, regular/commission employee types, executive/non-executive, processing worker type (bot or human) and/or many other dimensions with relationships back to the employee, client and company level.

Detected items can be stored and worked as tickets through the UI, with real time collaboration on flagged items. Items can be claimed from a queue by human or bot workers with visibility of the item status provided back to all users reviewing item queues (see FIG. 13). The app can deep link back to HRMS where necessary to assist with processing changes.

Types of analysis surfaced in current state and trended through the GUI may include but are not limited to clustering of payroll data, anomaly classification tables, and factor analysis.

The resulting detected deviations can be evaluated using inference based on domain knowledge. For example, a variation in net pay is expected if the taxes are off. This means that the inference done post detection can provide a filter for core anomalies. One approach for this inferencing is to build a collection of business rules that define acceptable changes to net pay based on variations in specific groups of other pay codes. A decision tree is one technique that uses the amount by which changes in the codes impact the net or gross, or taxable portion of the pay. The decision tree would then classify the difference in the net pay based on what changed in the other codes.

The data available allows the business to access and analyze it on demand. Likewise, the content can be exposed to or clients for them to self-service. For internal use, the system can spot trends in the payroll to drive conversations with the client. The clients can answer some of their questions without the need to contact the payroll auditor. Analysis opportunity includes variance analysis over time, and information in this regard can be consumed off a results table.

Processing of a central tendency metric and standard deviation can be done in a Spark Cluster. A master node can receive the sparse matrix, where the master node partitions and breaks apart the sparse matrix for slave nodes to process (on a row and column partition). Slave nodes can then return partitions to be recompiled.

While example embodiments discussed above employ univariate and/or multivariate statistical comparisons as part of the AI to detect payroll anomalies, it should be understood that other AI analysis techniques could be employed if desired by a practitioner. For example, anomaly detection may employ a Bayesian network or a decision tree to help improve the anomaly detection. This can support learning the probability that a part of the paycheck is abnormal given the employee's current state, whether the employee is on leave, vacation, working in a different state, etc. These can be learned parameters from the employee's history. The anomaly detection system can then take these types of factors into consideration.

Figure 14:
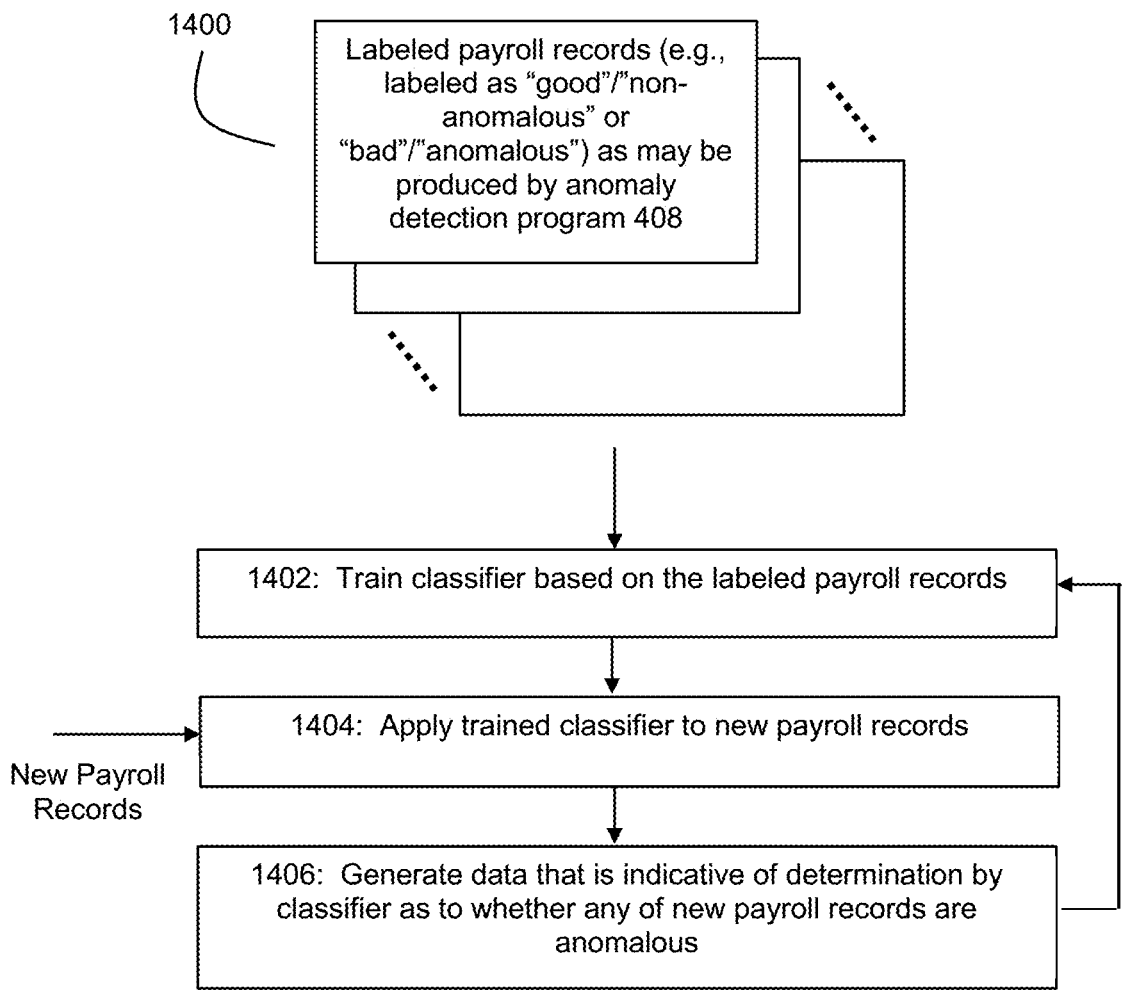
FIG. 14 shows an example process flow for machine learning classification of payroll data.

As another example, the anomaly detection based on univariate and/or multivariate statistical comparisons as described herein can efficiently produce a large set of accurately labeled payroll records (where each payroll record can be labeled as "good" (e.g., normal/non-anomalous) or "bad" (e.g., abnormal/anomalous) based on the statistical comparisons. FIG. 14 shows an example process flow for machine learning classification of payroll data, which can be carried out by one or more processors. In the example of FIG. 14, the labeled payroll records 1400 can be used to train a machine learning (ML) classifier at step 1402 to recognize anomalous payroll records within payroll data. For example, supervised learning or unsupervised learning techniques can be used to train such a ML classifier. Further still, the labeled payroll records can be combined with larger data sets about employees (e.g., records as to times when employees are on vacation, leave, etc.) to determine sets of feature vectors for use by the ML classifier to draw conclusions about whether a given payroll record is anomalous or not. The trained classifier can then be applied to new payroll records to determine whether a new payroll record is anomalous (step 1404). The new payroll record can then be labeled with the determined classification (e.g., as normal/non-anomalous or abnormal/anomalous) (step 1406). Feedback may be employed to then update the training of the classifier based on the newly classified data if desired. A practitioner may choose to limit this feedback to payroll records whose accuracy of classification has been independently verified by payroll specialists. However, this need not be the case. Furthermore, in an example embodiment, multiple processors can be employed to perform tasks for the process flow of FIG. 14 in parallel. For example, different processors can perform steps 1402 and 1404 in parallel. As another example, different processors can perform the same step (e.g., step 1404) in parallel on different payroll records (or components thereof). Through such parallel processing techniques, improved performance can be achieved.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An artificial intelligence computer system for scalably detecting anomalies within payroll data for a plurality of payees, the payroll data comprising a plurality of payroll records that are associated with a plurality of payees, the system comprising:
    a processor; and
    a memory;
    wherein the processor, in cooperation with the memory, is configured to (1) process a history of the payroll records for a payee to generate a payee-specific pay distribution model, (2) compare the payroll record for a pay period for the payee with the payee-specific pay distribution model, (3) determine whether a payroll anomaly for the payee exists within the payroll record for the pay period for the payee based on the compare operation, (4) in response to a determination that a payroll anomaly for the payee exists, flag the payroll anomaly for further review or analysis, (5) label the payroll record corresponding to the flagged payroll anomaly as non-anomalous or anomalous based on the further review or analysis, (6) perform the process, compare, determine, flag, and label operations for a plurality of payees, and (7) train a machine learning classifier to recognize anomalous payroll records based on (i) the labeled payroll records and (ii) additional data that indicates when the payees are on vacation or leave.

2. The system of claim 1 wherein the payroll records comprise a plurality of values corresponding to a plurality of different pay components, and wherein the processor is further configured to:
    generate a payee-specific pay distribution model for each of a plurality of the pay components based on the processed history so that the payee is associated with a plurality of payee-specific, pay component-specific, pay distribution models;
    for each of a plurality of the pay components within the payroll record for the pay period for the payee, compare the value of that pay component within the payroll record for the pay period for the payee with the payee-specific pay distribution model for that pay component; and
    determine whether a payroll anomaly for the payee exists within the payroll record for the pay period for the payee based on the compare operations.

3. The system of claim 2 wherein the processor is further configured to, for each of a plurality of the pay components and for each of a plurality of the payees, (1) compute an average for the values of that pay component in the history for that payee, (2) compute a variance for the values of that pay component in the history for that payee, and (3) generate the payee-specific pay distribution model for that pay component based on the computed average and the computed variance.

4. The system of claim 3 wherein the processor is further configured to create the payee-specific pay distribution model for each of a plurality of the pay components based on the computed averages and variances for the pay components.

5. The system of claim 3 wherein the computed average comprises a mean, and wherein the computed variance comprises a standard deviation.

6. The system of claim 5 wherein each of a plurality of the payee-specific, pay component-specific, pay distribution models comprises (1) a first data value that represents the computed mean for the pay component and payee associated with that pay distribution model and (2) a second data value that represents the computed standard deviation for the pay component and payee associated with that pay distribution model.

7. The system of claim 6 wherein each of a plurality of the payee-specific, pay component-specific, pay distribution models further comprises a third data value that represents a tolerance for the pay component and payee associated with that pay distribution model.

8. The system of claim 6 wherein the processor is further configured to determine whether the value for a pay component in the payroll record for the pay period for the payee falls outside of a normal distribution defined by the first data value and the second data value by more than a defined number of the second data value.

9. The system of claim 1 wherein the processor is further configured to repeat the process, compare, determine, flag, label, and perform operations for a plurality of payees with respect to a new pay period and a new history of the payroll records so that the anomaly detection self-adjusts to changes in pay patterns for payees over time.

10. The system of claim 1 wherein the processor is further configured to determine whether any payroll anomalies exist based on an evaluation of a value within the payroll record for the pay period according to a univariate statistical analysis assuming a defined distribution of values according to the payee-specific pay distribution model.

11. The system of claim 10 wherein the defined distribution is a normal distribution.

12. The system of claim 1 wherein the processor is further configured to determine whether any payroll anomalies exist based on an evaluation of the payroll record for the pay period according to a multivariate statistical analysis assuming a defined distribution of values according to the payee-specific pay distribution model.

13. The system of claim 12 wherein the defined distribution is a normal distribution.

14. The system of claim 1 wherein the processor is further configured to process the payroll records as a matrix so that the process and compare operations are performed using matrix manipulation operations on groups of payroll records.

15. The system of claim 1 wherein the processor is further configured to perform the process and compare operations on a plurality of the payroll records and/or a plurality of components of the payroll records in parallel.

16. The system of claim 1 wherein the processor is further configured to partition the payroll records into a plurality of partitions for parallel execution of the process operation and/or compare operation.

17. The system of claim 1 wherein the processor comprises a graphics processing unit (GPU).

18. The system of claim 1 wherein the processor comprises a plurality of processors.

19. The system of claim 1 further comprising a database for storing the payroll records, and wherein the processor is further configured to access the database to read the payroll records.

20. The system of claim 1 wherein the processor is further configured to perform the process, compare, determine, flag, label, and train operations for each payee within an entire payee population of a company for a current pay period.

21. A method for scalably detecting anomalies within payroll data for a plurality of payees, the payroll data comprising a plurality of payroll records that are associated with a plurality of payees, the method comprising:
a processor processing a history of the payroll records for a payee to generate a payee-specific pay distribution model;
the processor comparing the payroll record for a pay period for the payee with the payee-specific pay distribution model;
the processor determining whether a payroll anomaly for the payee exists within the payroll record for the pay period for the payee based on the comparing step;
in response to a determination that a payroll anomaly for the payee exists, the processor flagging the payroll anomaly for further review or analysis;
the processor labeling the payroll record corresponding to the flagged payroll anomaly as non-anomalous or anomalous based on the further review or analysis;
the processor performing the processing, comparing, determining, flagging, and labeling steps for a plurality of payees; and
the processor training a machine learning classifier to recognize anomalous payroll records based on (i) the labeled payroll records and (ii) additional data that indicates when the payees are on vacation or leave.

22. A computer program product for scalably detecting anomalies within payroll data for a plurality of payees, the payroll data comprising a plurality of payroll records that are associated with a plurality of payees, the computer program product comprising:
a plurality of instructions resident on a non-transitory computer-readable storage medium, wherein the instructions are configured for execution by a processor to cause the processor to perform a method comprising:
processing a history of the payroll records for a payee to generate a payee-specific pay distribution model;
comparing the payroll record for a pay period for the payee with the payee-specific pay distribution model;
determining whether a payroll anomaly for the payee exists within the payroll record for the pay period for the payee based on the comparing step;
in response to a determination that a payroll anomaly for the payee exists, flagging the payroll anomaly for further review or analysis;
labeling the payroll record corresponding to the flagged payroll anomaly as non-anomalous or anomalous based on the further review or analysis;
performing the processing, comparing, determining, flagging, and labeling steps for a plurality of payees; and
training a machine learning classifier to recognize anomalous payroll records based on (i) the labeled payroll records and (ii) additional data that indicates when the payees are on vacation or leave.

23. A machine learning method comprising:
a processor learning, for a payee, a typical distribution of values for a plurality of pay components within a payroll history for the payee;
the processor training a classifier for the payee based on (1) the learned typical distribution for the payee, (2) a plurality of payroll records that are labeled as abnormal, and (3) additional data that indicates when payees are on vacation or leave to distinguish between a normal payroll record for the payee and an abnormal payroll record for the payee on a per pay component basis; and
the processor evaluating a payroll record for the payee according to the trained classifier to determine whether the evaluated payroll record includes an anomaly;
in response to a determination that the evaluated payroll record includes an anomaly, the processor generating data that is indicative of the determined anomaly; and
the processor performing the learning, training, evaluating, and generating steps for a plurality of different payees.

24. The method of claim 23 wherein the processor comprises a plurality of processors.

25. The method of claim 23 wherein the performing step comprises the processor performing the learning, training, evaluating, and generating steps for a plurality of different payees in parallel.

26. The method of claim 23 wherein the training step comprises the processor training the classifier for the payee based on (1) the learned typical distribution for the payee, (2) the payroll records that are labeled as abnormal, (3) a plurality of payroll records that are labeled as normal, and (4) the additional data that indicates when payees are on vacation or leave to distinguish between a normal payroll record for the payee and an abnormal payroll record for the payee on a per pay component basis.

27. The method of claim 23 wherein the additional data is part of larger data sets about the payees, wherein the larger data sets further comprise history information about states where the payees have worked, and wherein the learning step further comprises the processor learning the typical distributions based on the payroll histories for the payees and larger data sets about the payees including the additional data and the history information.

28. The method of claim 23 wherein the additional data includes records as to times when the payees are on vacation or leave.

29. The method of claim 23 wherein the evaluating step includes the processor (1) determining sets of feature vectors for the payees based on the payroll records for the payees and the additional data for the payees and (2) applying the determined sets of feature vectors to the trained classifier to determine whether any of the evaluated payroll records includes an anomaly.

30. The system of claim 1 wherein the processor is further configured to apply the trained machine learning classifier to a plurality of new payroll records to generate data indicative of whether any of the new payroll records are anomalous.

31. The system of claim 1 wherein the additional data is part of larger data sets about the payees, wherein the larger data sets further comprise history information about states where the payees have worked, and wherein the processor is further configured to train the machine learning classifier to recognize anomalous payroll records based on the labeled payroll records and the larger data sets about the payees including the additional data and history information.

32. The system of claim 31 wherein the additional data includes records as to times when the payees are on vacation or leave.

33. The system of claim 1 wherein the processor is further configured to apply the trained machine learning classifier to sets of feature vectors derived from a plurality of new payroll records and the additional data to generate data indicative of whether any of the new payroll records are anomalous.

34. The system of claim 1 wherein the processor is further configured to label the payroll records corresponding to flagged payroll anomalies as non-anomalous or anomalous in response to user input.

* * * * *